United States Patent
Bilcu et al.

(10) Patent No.: US 7,237,721 B2
(45) Date of Patent: Jul. 3, 2007

(54) IMAGE PROCESSING FOR PATTERN DETECTION

(75) Inventors: Radu Bilcu, Tampere (FI); Markku Vehviläinen, Tampere (FI); Adrian Burian, Tampere (FI)

(73) Assignee: Nokia Corporation, Espoo (FI)

( * ) Notice: Subject to any disclaimer, the term of this patent is extended or adjusted under 35 U.S.C. 154(b) by 113 days.

(21) Appl. No.: 11/136,323

(22) Filed: May 24, 2005

(65) Prior Publication Data

US 2006/0266836 A1    Nov. 30, 2006

(51) Int. Cl.
G06K 7/10    (2006.01)
G06K 9/40    (2006.01)

(52) U.S. Cl. .............. 235/454; 382/321; 382/255; 235/462.25

(58) Field of Classification Search .............. 235/462.01–462.49; 382/255, 321
See application file for complete search history.

(56) References Cited

U.S. PATENT DOCUMENTS

| | | | | |
|---|---|---|---|---|
| 5,504,318 A | * | 4/1996 | Joseph et al. | 235/454 |
| 5,550,935 A | * | 8/1996 | Erdem et al. | 382/260 |
| 5,814,803 A | * | 9/1998 | Olmstead et al. | 235/462.01 |
| 6,585,159 B1 | * | 7/2003 | Meier et al. | 235/462.31 |
| 2006/0213999 A1 | * | 9/2006 | Wang et al. | 235/462.25 |

FOREIGN PATENT DOCUMENTS

EP    0 889 428 A2    1/1999

OTHER PUBLICATIONS

"Bar Code Recovery via the EM Algorithm", William Turin, et al., IEEE Transactions on Signal Processing, vol. 46, No. 2, Feb. 1998, pp. 354-363.
"Landweber Image Restoration with Adaptive Step-Size", Radu Ciprian Bilcu, et al., Multimedia Technologies Laboratory, Nokia Research Center, pp. 1-4.
"Munimum Discrimination Information Bar Code Decoding", William Turin, et al., 1996-IEEE, pp. 255-258.
"Camera-Based Bar Code Recognition System Using Neural Net", Shu-Jen Liu, et al., Proceedings of 1993 International Joint Conference on Neural Networks, pp. 1301-1305.
"A New Decode Algorithm for Binary Bar Codes", Zuguang Cai, Pattern Recognition Letters 15 (1994) pp. 1191-1199.
"Waveform Recognition with Application to Bar Codes", Eugene Joseph, et al., 1991 IEEE, pp. 129-134.
"Remote Bar-Code Localisation Using Mathematical Morphology", S. Arnold, et al., Image Processing and its Applications, Conference Publication No. 465 © EE 1999, pp. 642-646.

(Continued)

Primary Examiner—Michael G. Lee
Assistant Examiner—Jamara A. Franklin
(74) Attorney, Agent, or Firm—Perman & Green, LLP

(57) ABSTRACT

The present invention relates to an image pre-processing method for a pattern detection system, such as a bar code detection system. The method comprises the steps of: detecting a start point and an end point of a pattern on the basis of image data of at least a portion of a captured image, estimating a point spread function from the image data or a modified image data on the basis of the detected start point and the end point, and restoring the image data or the modified image data using the estimated point spread function.

16 Claims, 4 Drawing Sheets

OTHER PUBLICATIONS

"Bar Code Waveform Recognition Using Peak Locations", Eugene Joseph, et al., IEEE Transactions on Pattern Analysis and Machine Intelligence, vol. 16, No. 6, Jun. 1994, pp. 630-640.

"Deblurring of Bilevel Waveforms", Eugene Joseph, et al., IEEE Transactions on Image Processing, vol. 2, No. 2, Apr. 1993, pp. 223-235.

* cited by examiner

IMAGE PROCESSING FOR PATTERN DETECTION

FIELD OF THE INVENTION

The present invention relates to a method and equipment for arranging pattern detection, for instance barcode detection.

BACKGROUND OF THE INVENTION

Bar codes have been used in a wide variety of applications as a source for information, for instance for product identification and pricing. A bar code is a set of binary numbers and typically consists of black bars and white spaces, or black and white squares. One-dimensional barcodes are typically consisted of black and white lines, while two-dimensional barcodes are arrays of black and white squares or hexagons or ellipses. Usually the standard classical devices utilized for bar code detection use laser beams (for example, dedicated devices used in supermarkets and stores). Since many mobile devices are already equipped with cameras, it also is possible to arrange bar code detection in these devices.

The physical dimension of the bar codes to be detected varies quite a lot. Bar codes that have low information density on a large area can be detected easily with a normal camera phone. This is because, for such bar codes, the distance between the printed bar code and the lens of the camera must be long in order to include the complete bar code in the viewfinder. In this case the image containing the bar code is situated in the in-focus range of the camera and the quality of the captured image is typically good enough for detection. On the other hand, for the bar codes printed on small areas—even if they have low information density— the distance between the printed code and the camera must be very short. This is due to the fact that for such small codes, the resolution of the printed bar code, situated in the in-focus range of the camera, is around the maximum resolution of the optical system of the camera phone. In order to deal with this problem, the bar code is captured at a distance that is much shorter than the focal distance of the camera. However, when a bar code is captured at a very short distance, the captured image is highly influenced by the distortions of the optical system and sensor of the camera (out of focus). Typically, the captured image is distorted by: sensor noise added to the captured image, optical blur and vignetting that are due to the optical system of the camera (lenses). An example of such an image captured using a short distance between the camera and the printed bar code is depicted in FIG. 1. It is likely that bar code detection applied directly to this image will fail due to the amount of blurring and, therefore, pre-processing is desirable.

One way to improve the quality of the captured image for small bar codes is to use lenses with a very short focal distance that introduce very little blur in the captured image. However, using such a lens requires additional external attachments to the mobile phones, and can cause discomfort and annoy the users. Also, this will add more costs.

IEEE publication "*Bar Code Recovery via the EM Algorithm*", William Turin and Robert A. Boie, IEEE Transactions on Signal Processing, Vol. 46, No. 2, February 1998, pages 354-363, discloses a bar code recovery method based on the statistical expectation-maximization (EM) algorithm. In this method a bi-level bar code is blurred and fitted to the input line. The point spread function (psf) is assumed to be gaussian and the positions of the bar code edges are assumed to be unknown. The parameter of the psf is also assumed to be unknown. The maximum likelihood approach is used to find the position of the bar code edges. This reference is limited to describe a solution for situations where the amount of blur is small. For medium and highly blurred images there are no examples in the referred paper that illustrate the performance of that method. Moreover, the method mentioned in this reference is derived for bar code detectors based on infrared sensors and the model of such sensors is used in the derivation of the algorithms and methods. In addition to that, the algorithm proposed in the above paper has a large computational complexity that makes it unsuitable for implementation in mobile devices.

BRIEF DESCRIPTION OF THE INVENTION

There is now provided an enhanced solution for pattern detection. This solution may be achieved by a method, an electronic device, and a computer program product that are characterized by what is disclosed in the independent claims. Some preferred embodiments of the invention are set forth in the dependent claims.

The invention is based on the combination of the following pre-processing steps for a pattern detection system: detecting a start point and an end point of a pattern on the basis of image data of at least a portion of a captured image, estimating a point spread function from the image data or a modified image data on the basis of the detected start point and end point, and restoring the image data or the modified image data using the estimated point spread function.

In one embodiment of the invention, the pattern is a bar code and the restored image data or the restored modified image data is input for a bar code detection procedure.

In another embodiment of the invention, a line from the selected portion is selected as the image data for the pre-processing steps.

Yet in one embodiment of the invention, a noise reduction algorithm is applied for the image data.

The main advantage of the invention is that it makes more reliable pattern detection possible. For instance, in the case of bar code detection appliances, the detection of small printed bar codes is enhanced. The features of the present invention reduce the different distortions introduced by a sensor and an optical system of an imaging device, thereby increasing the quality of the captured image for pattern detection purposes. Reliable detection can also be achieved in electronic devices with a miniature size camera module, such as mobile terminals with embedded cameras. Therefore, it is possible to avoid additional optics and expenses in enabling detection, and it is not necessary to increase the size of the camera portion in the devices. The present pre-processing can be fully automatic and adaptive and does not require any set-up or tuning from the user. The required parameters and functions may be adaptively computed from the input image such that no calibration is needed.

BRIEF DESCRIPTION OF THE DRAWINGS

In the following, the invention will be described in further detail by means of some embodiments and with reference to the accompanying drawings, in which.

DETAILED DESCRIPTION OF THE INVENTION

Figure 1:
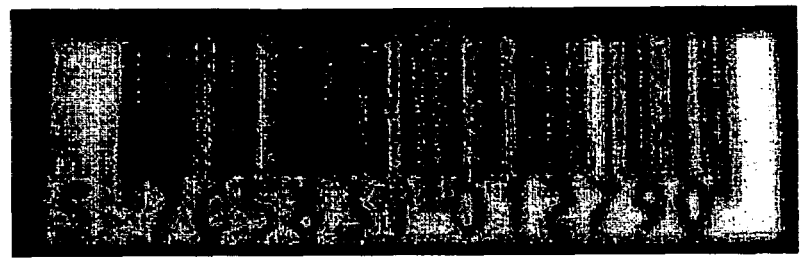
FIG. 1 is an exemplary distorted image of a bar code.
Figure 2:
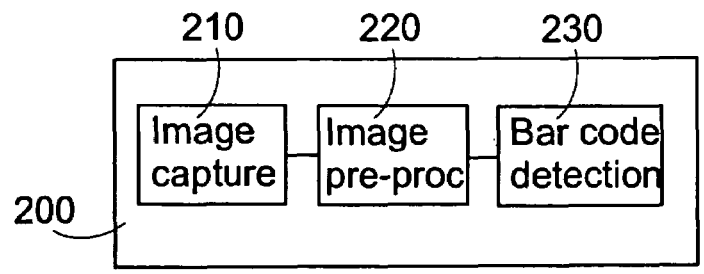
FIG. 2 is a block diagram illustrating features of an electronic device adapted for bar code detection.

FIG. 2 illustrates the main features relevant to the present invention in an electronic device 200 equipped with a camera. The electronic device 200 comprises image capturing means 210, image pre-processing means 220, and bar code detection means 230.

The image capturing means 210 may be provided by appropriate digital imaging technology. For instance, CMOS (complementary metal-oxide semiconductor circuit) or CCD (charge-coupled device) based sensors and suitable optics familiar to a man skilled in the art may be used. Light is converted into electric charges in image sensors, RGB values are defined for pixels, and electric charges are converted into digital format. It should be noted that the image capturing means 210 may be capable of recording both still images and video images.

The electronic device 200 is not limited to any specific device, but the present features may be provided to a device suitable for capturing images and equipped with bar code detection. For instance, the electronic device 200 could be a mobile communications device, a digital camera, or an auxiliary device for another electronic device. Examples of mobile communications devices are devices capable of data transmission with a PLMN (public land mobile network) network, such as a GSM/GPRS (global standard for mobile communication/general packet radio service) network or a third-generation network (for instance the 3GPP (third generation partnership project) system).

It should be noted that the invention could also be applied such that the camera or the image capturing means 210 is not integrated to the electronic device 200, but a camera producing image information is connected to the electronic device 200.

The electronic device 200 comprises one or more processing units and memory for storing data and program code controlling the processing unit. The processing unit performs the processing, such as compression, and storage of digital image information into the memory. Computer program code portions stored in the memory and executed in the processing unit may be used for causing the device 200 to implement means for providing the inventive functions relating to the image pre-processing functions by unit 220. Some embodiments of the inventive functions will be illustrated below in association with FIGS. 3 to 7. Such a computer program code may be independent or part of a software code, for instance part of bar code detection application software. The electronic device 200 also comprises other features, such as user interface facilities and a transceiver for wireless communication.

A chip unit or some other kind of hardware module for controlling the electronic device 200 may, in one embodiment, cause the device to perform the inventive functions. For instance, such a hardware module could comprise the functions of the unit 220 illustrated in more detail below. The hardware module comprises connecting means for connecting the device 200 mechanically and/or functionally. Thus, the hardware module may form part of the device 200 and could be removable. Some examples of such a hardware module are a sub-assembly, a portable data storage medium, an IC card, or an accessory device. Computer program codes causing the inventive functions can be received via a network and/or be stored in memory means, for instance on a disk, a CD-ROM disk or other external memory means, from which they can be loaded into the memory of the device 200. The computer program can also be loaded through a network by using a TCP/IP protocol stack, for instance. Thus, computer program code portions specific for the present invention may be embedded into an image processing chain in the device 200 or the computer program code portions may be implemented as a separate installation package that is downloaded and installed on demand. Hardware solutions or a combination of hardware and software solutions may also be used to implement the inventive functions.

Image pre-processing by unit 220 is the first step in a more complex bar code detection system. The aim of the pre-processing is to improve the quality of the input image that makes the detection of the bar code possible. The main steps of the pre-processing are: detection of a start point and an end point of a bar code on the basis of image data of at least a portion of a captured image, estimation of a point spread function from at least part of the image data portion on the basis of the detected start point and the end point, and restoring the image data using the estimated point spread function. These features and some other complementary features are illustrated in the following embodiment with reference to FIG. 3.

Figure 3:
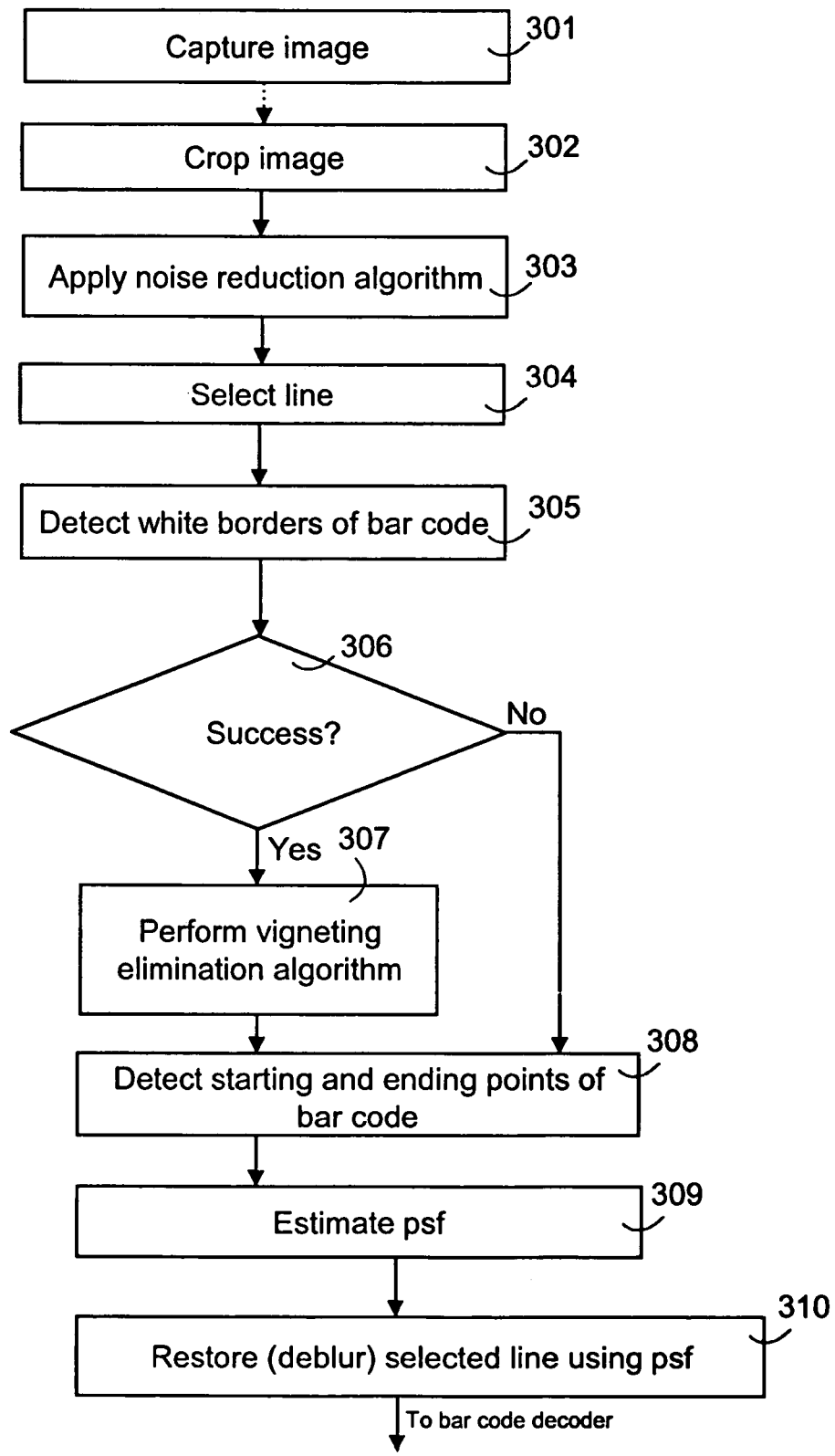
FIG. 3 is a flow chart illustrating a method according to an embodiment of the invention.

In step 310 of FIG. 3, the image is captured and image data suitable as input for the present pre-processing method is prepared. The captured image data can be Bayer matrix image data obtained directly from a digital sensor (for instance, CCD or CMOS), a colour image obtained at the output of the imaging chain, or a JPG image obtained after compression. This is a specific advantage of the present method, enabling it to be incorporated into the image processing chain or implemented as a separate installation package that is installed on demand.

For instance, when Bayer matrix data is used as input, the image obtained from the sensor contains four components: one Red component, two Green components and one Blue component. In one embodiment of the present invention, one of the Green components is applied for later processing. The reasons for this are the following: firstly, the size of one component from the Bayer matrix is one quarter the size of the whole sensor image, and this reduces the computational complexity and increases the processing speed. Secondly, the Green component is the sharpest one, and this makes the de-blurring process easier.

In another embodiment the pre-processing is applied to the colour image obtained at the end of the imaging chain. In this case the colour image is transformed to a grey scale image by appropriate averaging of the three colour components Red, Green, and Blue. It is also possible to use just one component of the colour image instead of the grey level image.

In either case (Bayer matrix data or grey scale image), the output of this block is passed to the next step 302.

In step 302, the image is cropped. In this step, just a small part of the input image may be retained in order to increase the processing speed. For instance, several adjacent lines from one of the image components are retained. For instance, 20 adjacent lines around the line of interest are retained and transmitted to the next block for de-noising. However, the retaining is not limited to any specific number of lines. In the present example, several lines from the input image are selected, instead of only one line, thereby enabling the following advantages: Firstly, the next step of de-noising can be implemented in several different ways using algorithms that necessitate more input data. Secondly, as much information as possible about the real image is maintained in order to obtain good de-noising performance.

One important issue in this step is how to select the line of interest, i.e. the line that is actually enhanced and used for bar code detection. A horizontal guiding line displayed on a screen of the electronic device 200 may be used to solve this problem. In one embodiment, the user may select the line of interest manually on a display device. However, other feasible methods also exist. The user may be prompted to move the device 200 along the printed bar code such that this line crosses the image of the code. Since the coordinates of the horizontal line are known, the corresponding area around the line from the captured image is selected as an area of interest.

In step 303, de-noising is carried out. Thus, a noise reduction algorithm is applied to the cropped part of the image in order to decrease the level of sensor noise. The following two embodiments illustrate this step.

The first approach is simple and also more sensitive to the rotation of the camera in relation to the printed bar code. In this approach the line of interest and three of its adjacent lines are simply averaged. This approach works fine when the bar code orientation is close to horizontal (small rotations do not distort the image since just four adjacent lines are averaged). For situations where the bar code is rotated a great deal this method for de-noising can introduce more blur. This situation may be corrected by detection of bar code orientation, either manually or automatically.

The second approach for image de-noising in step 303 is to implement a more sophisticated algorithm. An example of such an algorithm is the Sigma filter. In this case all 20 adjacent lines, and not only four lines, are used as input. Both algorithms have been tested in practice and they have shown good performance.

In step 304, a line selection is performed, whereby one or more lines are selected for further processing. In the present embodiment, just one line from the cropped image is retained.

If the average method is used for filtering in the preceding step 303, then the output of the de-noising process consists of a single line that is passed to the next block 305, i.e. step 304 is already carried out in step 303. If the de-noising is performed by using, for instance, the Sigma filter applied on 20 adjacent lines, one of the resulting lines are selected for further processing.

In step 305, a vignetting elimination procedure is applied. In this step the process of vignetting (non-uniform illumination) introduced by the optical system of the electronic device 200 is inversed and the selected line is corrected accordingly.

In the following, an embodiment for performing the vignetting elimination procedure is described. Firstly, the white borders of the bar code are detected. This is done by detecting white areas from the image located at the left and right sides of the bar code image. For the detection of white areas, two approaches are illustrated. In the first approach, some local averages at the beginning and at the end of the selected line are computed. From the computed averages, the larger ones that correspond to the white areas surrounding the bar code are selected. In the second approach,
illustrated later in connection with FIG. 7, the starting and the ending points of the bar code are first detected, and it is assumed that the white border of the bar code has a minimum width. Pixels located in these areas are considered white pixels.

If the white borders are detected successfully, the following algorithm is implemented for vignetting elimination. Otherwise, this step of vignetting elimination is skipped.

Figure 4:
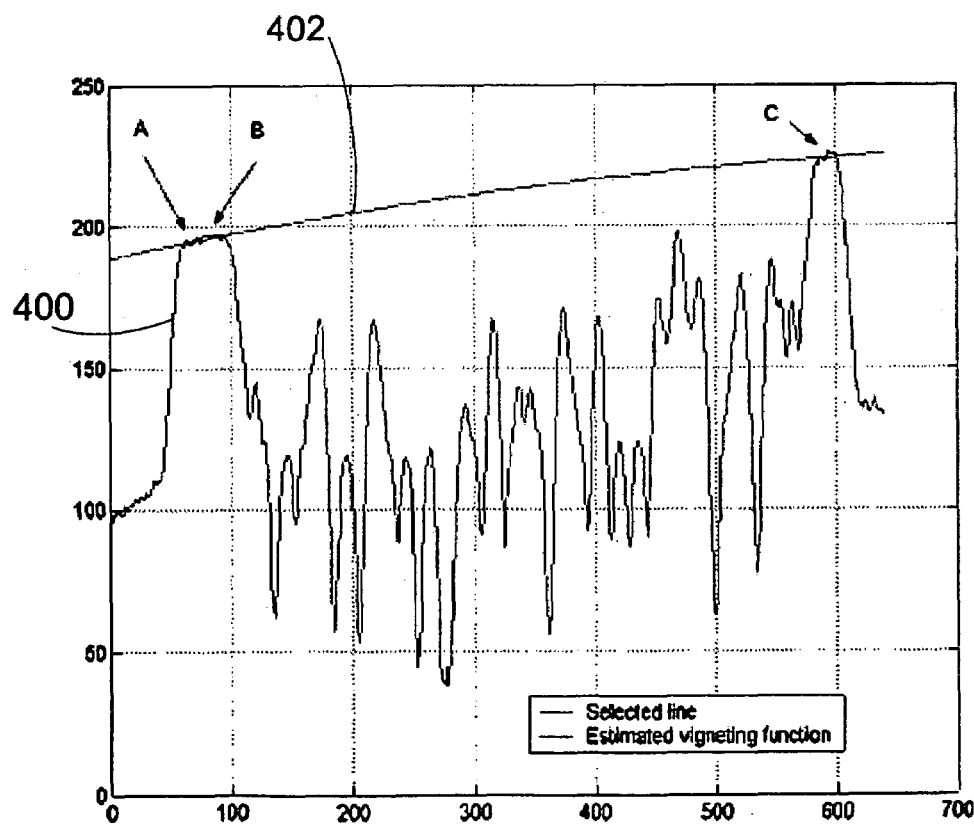
FIG. 4 illustrates an example of a selected line of a bar code and points that are used for automatic vignetting correction.

An example of a selected line 400 containing a bar code is depicted in FIG. 4. Here the presence of the white border can be seen. The algorithm calculates three local mean values as follows: two local mean values are computed on the left of the bar code (denoted as A and respectively B in FIG. 4) and one mean value on the right side of the code (denoted as C in FIG. 4). It is assumed that the vignetting function can be modelled as a polynomial of the second order:

$$y(x)=Dx^2+Ex+F$$

where x is the horizontal pixel coordinate and D, E, and F are constant coefficients.

The following system of equations is formed using the three averages computed above:

$$\begin{cases} A = Dx_1^2 Ex_1 + F \\ B = Dx_2^2 + Ex_2 + F \\ C = Dx_3^2 + Ex_3 + F \end{cases}$$

where $x_1$, $x_2$, and $x_3$ are the coordinates where the three local averages A, B, and respectively C are computed.

The above system of equations is solved for D, E, and F, and the selected line is corrected dividing it by the corresponding values of y(x). FIG. 4 also shows the estimated vignetting function with line 402. As can be seen from FIG. 4, the present method of automatic vignetting detection can also address the problem of non-uniform illumination that is not due to the optical system but depends on the external lightning conditions. It is to be noted that also other devignetting methods may be applied. As an example of a more advanced devignetting method that could be applied, reference is made to method described in PCT patent application PCT/FI2004/050082, incorporated as a reference.

Referring again to FIG. 3, in step 308 the start point and the end point of the bar code are detected. Thus, the coordinates of the starting point and of the ending point of the bar code are detected from the selected line.

It has been realized that a reliable way to detect the starting and ending structures of a bar code is to detect a succession of both large white areas in the image followed by a sharp transition to black. When considering the line being processed, this is carried out by filtering with a window of length 15. The used one-dimensional filter is the difference between the maximum and minimum values of the signal inside the filter's window. The minimums of the filtered values closest to both endings of the signal are considered to belong to the white areas of the corresponding image. First large transitions after these points in both directions (from left to right and right to left) give the coordinates we are looking for.

In step 309, the point spread function (psf) is estimated directly from the selected line based on the starting and ending points of the bar code obtained in the previous step. Once the starting point and the ending point of the bar code have been detected in the processed line, the next step is to automatically detect the blurring function (psf). For this purpose the following information is utilized: there are a fixed and known number of bars in a complete one-dimensional bar code (for example, there are 95 bars in an EAN13 barcode). If also the two external borders with corresponding size are considered as bars, 97 bars are used in the end. The two external borders were also used for the present vignetting estimation. This means that only a fixed number of vertical lines can compose the bar code.

Each bar code starts and ends with a group of 5 lines of equal width that are arranged as follows: WHITE LINE, BLACK LINE, WHITE LINE, BLACK LINE, and WHITE LINE. The user can manually switch to inverse pattern detection, when black and white lines are exchanged. For EAN codes, these lines are longer than the rest of the lines and are situated at the beginning and end of the code. In the given example, a similar arrangement exists in the middle of the code, and this is also fixed for the EAN13 codes. But, in certain cases, like the UPC-E, the fixed middle part is missing. Also, the mostly used existing one-dimensional barcodes contain similar fixed starting and ending structures.

On the basis of this information, the psf may be detected as follows:

From the fact that the code is composed of 97 lines and knowing the coordinates $X_1$ and $X_2$ of the starting and ending point of the bar code, the length, in pixels, of one bar code is detected. For the EAN13, this is computed as $$L = \frac{X_2 - X_1}{97}.$$

This length should be computed on line using this procedure and cannot be saved as a parameter of the algorithm due to the fact that the bar code can have different sizes in the captured picture.

Knowing that every bar code starts with the above-mentioned set of five lines and all lines have the length of L pixels, the part from $X_1$ (beginning of the bar code) to $X_1+5L$ (the end of the first five lines) is cut from the processed line. This part of the processed line is denoted as Y.

Figure 5:
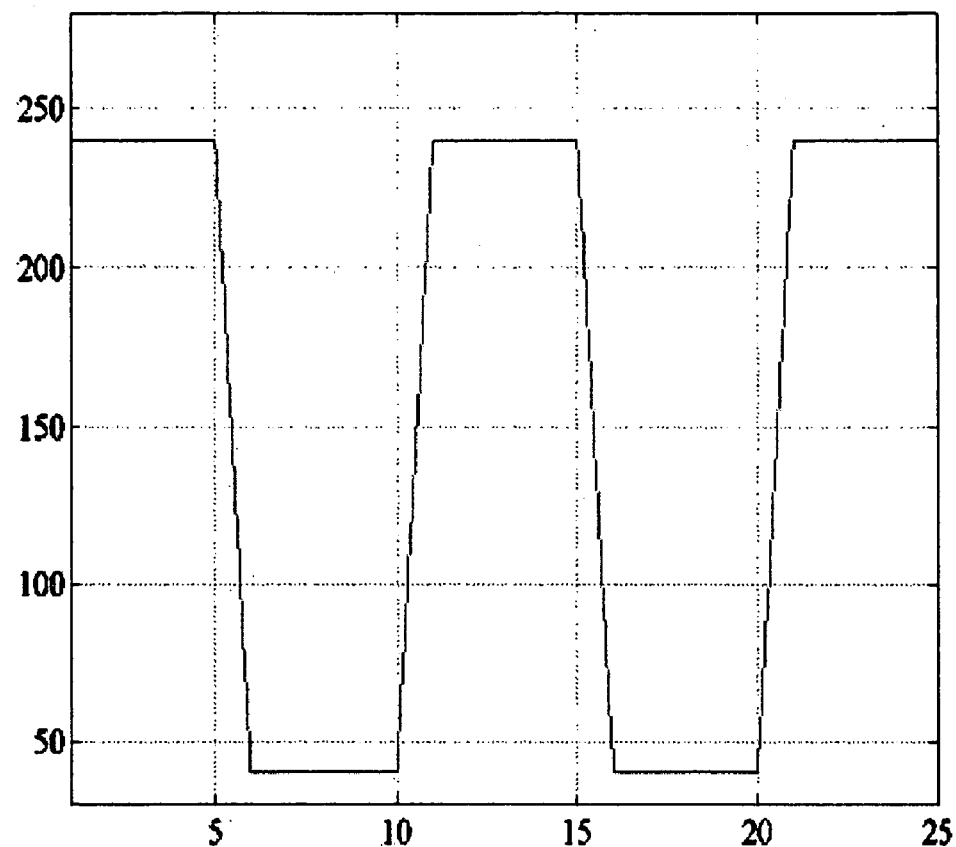
FIG. 5 illustrates an example of an ideal generated bar code used for psf detection.

It is assumed that the psf, denoted as P, has a Gaussian shape with a length equal to 5L and a variance σ. An ideal clean line is generated, denoted as V, corresponding to Y (the line containing the five parts that was blurred by the optical system to obtain Y). The ideal line is shown in FIG. 5.

The ideal line V is blurred with the generated psf's P for several values of σ (started with a small σ, for instance 0.1), whereby its value is increased at every iteration. At each iteration, the mean squared error between the blurred line and the input line Y is computed. For the first iterations (until σ approaches the optimum) the mean squared error decreases. When the value of σ becomes too large (it goes over the optimum), the mean squared error also increases. At this point the iterative process is stopped and the last good value of σ is retained.

At this point an estimation of the psf is available. The estimation of the psf is Gaussian in shape, with a length equal to 5L and a variance computed as in the above algorithm. This psf is used further to de-blur the whole line selected in step 304.

In step 310, the line is de-blurred. Thus, the selected line after the vignetting elimination in step 307 is restored (de-blurred) using the psf estimated in step 309. This process is done using the Landweber algorithm. Denoting the selected line in step 304 by W and the estimated psf by P, the following de-blurring algorithm is implemented:

```
Initialise the restored line: R⁽⁰⁾ = W
For k=1 to ITER
    R⁽ᵏ⁾ = R⁽ᵏ⁻¹⁾ + μP(-n)*(W - P * R⁽ᵏ⁻¹⁾ )
End,
``` where the index (k) denotes the iteration number, P(-n) is the flipped psf, * denotes convolution and μ is a constant step-size. It is noted that since the psf P is Gaussian in shape, it is also symmetrical and then P(-n)=P(n).

It is to be noted that other de-blurring algorithms that make use of a point spread function can be used for performing image restoration. Another embodiment imposes supplementary restrictions over the restored line during the iterative process. For example for EAN13, only the defined structure of each digit is accepted. Each digit of EAN13 is coded using 7 bits, so 128 possible combinations, but only 10 or 20 are valid. The iterative process changes then as follows: after each 10 iterations in the de-blurring algorithm, one digit will be decided. This decision will then be frozen for the rest of the iterative process. Decoding is performed sequentially from the left to the right of the barcode and then as a second process from the right to the left. If the decoding is the same and the check digit passes the test the result is validated.

Another examplary algorithm is illustrated in "Landweber Image Restoration with Adaptive Step-Size" authors Radu Ciprian Bilcu, Mejdi Trimeche, Sakari Alenius, and Markku Vehviläinen, incorporated as part of the application in its entirety.

Figure 6:
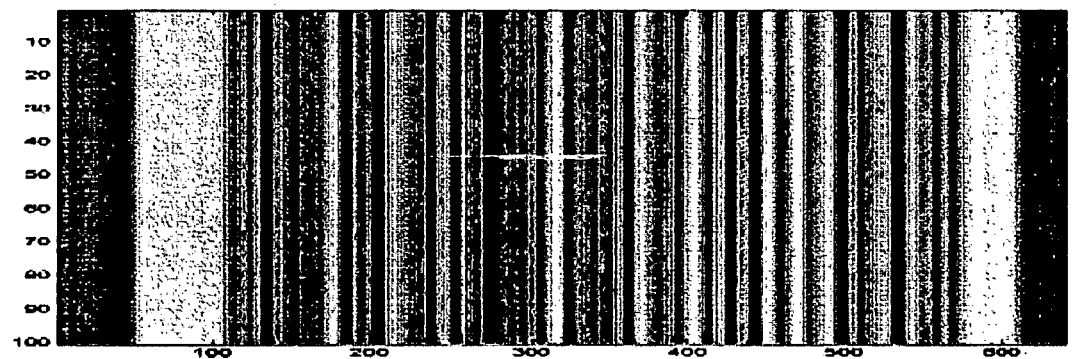
FIG. 6 illustrates an example of a restored image using an embodiment of the present invention.

The restored line of the image is then $R^{(ITER)}$ and it is passed to the next level of the system that performs the decoding of the bar code. FIG. 6 illustrates an example of a restored image using the present embodiment. The image shown in this Figure is obtained by repeating the restored line 100 times. In this way, the plotting of the restored line enables a more clear illustration of the achieved processing results. The delay of the iterative process is short, since only one line of the image is processed at each iteration.

Referring again to FIG. 3, it is to be noted that at least some of the steps may be carried out in a different order and all steps are not obligatory.

Figure 7:
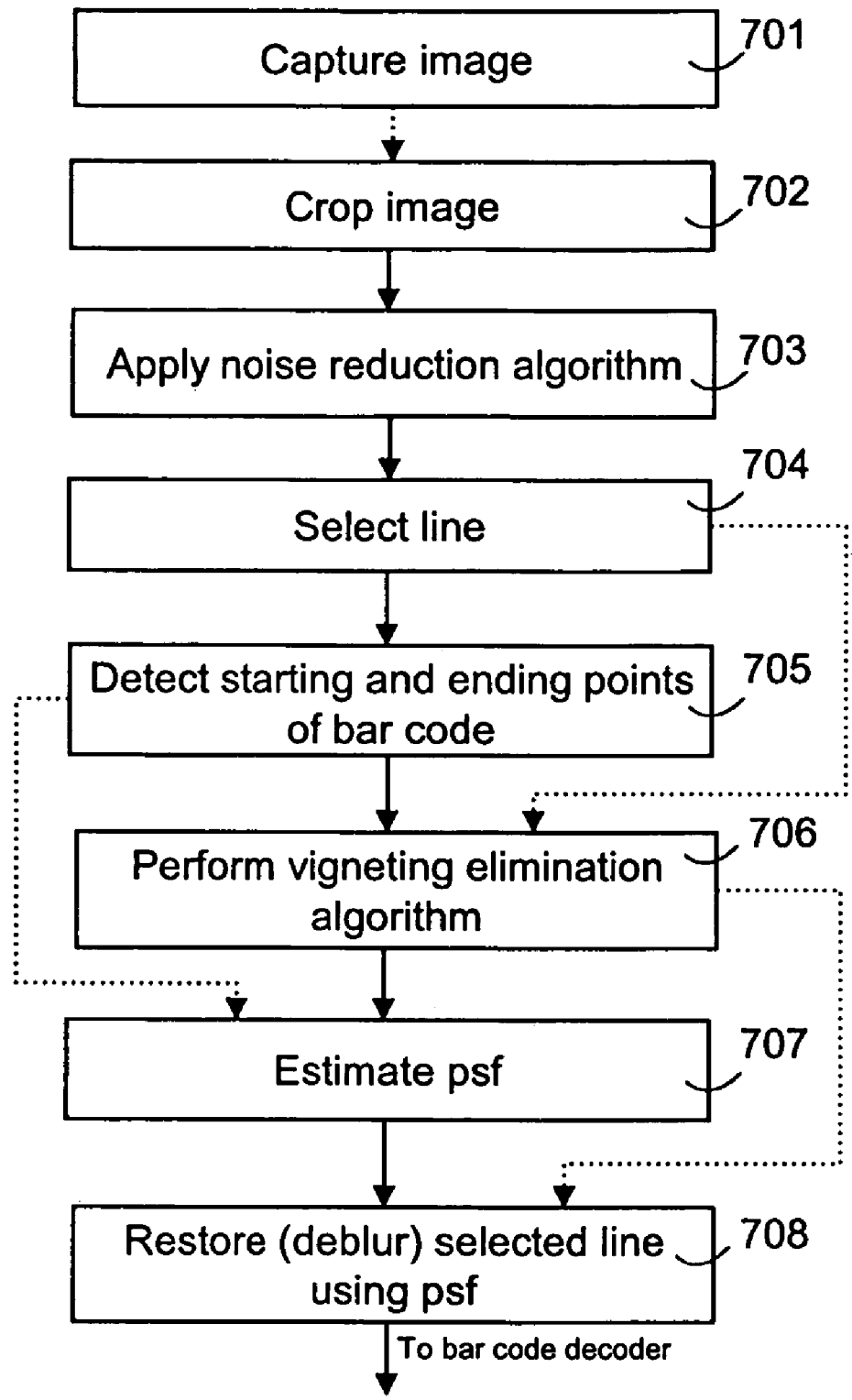
FIG. 7 is a flow chart illustrating a method according to another embodiment of the invention.

FIG. 7 illustrates another embodiment in which the steps 701 to 704 correspond to the steps 310 to 304 in FIG. 3. In step 705, end and start points of the bar code are detected. These two points are used in step 706 together with the selected line of the image (which is illustrated by the dashed line from 704 to 706) in order to perform vignetting elimination. The detected starting and ending points (estimated in step 705) are used further in step 707 to estimate the psf together with the corrected line of the image. Finally, in step 708, the selected line is restored, i.e. de-blurred, by using the estimated psf from step 707 and the corrected image line from step 706.

In one embodiment a further step, a rotation correction, is performed as part of image pre-processing prior to bar code detection by the unit 220. First, the position and orientation of the barcode in the captured image are detected. The convex hull of the detected object is then used. The main axis of this convex hull is considered to be the one that is equidistant from the two longest lines of it. The main axis together with its five neighbours are scanned. Only four values at each point will be retained, the maximum and minimum ones will be eliminated. The average of these four values will represent the final value of the current point. This embodiment may be applied with the above-illustrated embodiments, referring to FIGS. 3 and 7.

The application of the present invention is not limited to bar code detection but may be applied to any pattern recognition system, wherein some features of the image to be detected are known a priori. This a priori information is used for estimating the psf. The present invention may be applied in other pattern recognition purposes where there are some predefined structures or known successions of patterns. Another exemplary application area is text detection.

The accompanying drawings and the description pertaining to them are only intended to illustrate the present invention. Different variations and modifications to the invention will be apparent to those skilled in the art without departing from the scope of the invention defined in the appended claims. For instance, the features in the dependent claims may be combined with features stated in any preceding claims in the same claim category. Different features may thus be omitted, modified, or replaced by equivalents.

What is claimed is:

1. An image processing method for pattern detection, the method comprising the steps of:
   detecting a start point and an end point of a pattern on the basis of image data of at least a portion of a captured image,
   estimating a point spread function from the image data or a modified image data on the basis of the detected start point and end point, and
   restoring the image data or the modified image data using the estimated point spread function.

2. The method according to claim 1, wherein the pattern is a bar code and the restored image data or the restored modified image data is input for a bar code detection procedure.

3. The method according to claim 1, wherein the portion of data of the captured image is selected as the image data for pre-processing steps.

4. The method according to claim 3, wherein a line from the selected portion is selected as the image data for the pre-processing steps.

5. The method according to claim 1, wherein a noise reduction algorithm is applied to the image data.

6. The method according to claim 1, wherein a vignetting elimination procedure is applied before or after the start point and end point detection step, whereby the image data is vignetting corrected, or the modified image data for the point spread function estimation step and the restoring step is vignetting corrected.

7. The method according to claim 1, wherein the point spread function is estimated by utilizing knowledge of a known pattern existing in the image.

8. An electronic device comprising image capturing means and pattern detection means, wherein the electronic device comprises:
   means for detecting a start point and an end point of a pattern on the basis of image data of at least a portion of a captured image,
   means for estimating a point spread function from the image data or a modified image data on the basis of the detected start point and end point, and
   means for restoring the image data or the modified image data using the estimated point spread function.

9. The electronic device according to claim 8, wherein the electronic device comprises bar code detection means, and the electronic device is configured to input the restored image data or the restored modified image data for a bar code detection procedure.

10. An electronic device according to claim 9, wherein the electronic device is configured to estimate the point spread function making use of a known combination of black and white lines existing at the beginning of a bar code.

11. The electronic device according to claim 8, wherein the electronic device is configured to select the portion of data of the captured image as the image data for pre-processing steps.

12. The electronic device according to claim 11, wherein the electronic device is configured to select a line from the selected portion as the image data for the pre-processing steps.

13. The electronic device according to claim 8, wherein the electronic device is configured to apply a noise reduction algorithm to the image data.

14. The electronic device according to claim 8, wherein the electronic device is configured to apply a vignetting elimination procedure before the start point and end point detection step, whereby the image data is vignetting corrected, or
   the electronic device is configured to apply a vignetting elimination procedure after the start point and end point detection step, whereby the modified image data for the point spread function estimation step and the restoring step is vignetting corrected.

15. A computer program product operable on a processor, the computer program product comprising a computer program code configuring a processor to:
   detect a start point and an end point of a pattern on the basis of image data of at least a portion of a captured image,
   estimate a point spread function from the image data or a modified image data on the basis of the detected start point and end point, and
   restore the image data or the modified image data using the estimated point spread function.

16. An image processing unit for an electronic device with bar code detection facilities, wherein the image processing unit is configured to:
   detect a start point and an end point of a pattern on the basis of image data of at least a portion of a captured image,
   estimate a point spread function from the image data or a modified image data on the basis of the detected start point and the end point, and
   restore the image data or the modified image data using the estimated point spread function.

* * * * *